(12) United States Patent
Gombarick, Jr.

(10) Patent No.: US 8,601,753 B2
(45) Date of Patent: *Dec. 10, 2013

(54) ELECTRICAL WIRING SYSTEMS FOR USE IN ROOFING APPLICATIONS

(75) Inventor: Joseph Charles Gombarick, Jr., Phoenixville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 233 days.

This patent is subject to a terminal disclaimer.

(21) Appl. No.: 13/015,104

(22) Filed: Jan. 27, 2011

(65) Prior Publication Data

US 2012/0192512 A1    Aug. 2, 2012

(51) Int. Cl.
*E04D 13/18* (2006.01)
*E04H 14/00* (2006.01)
*H01L 31/042* (2006.01)

(52) U.S. Cl.
USPC .......................... 52/173.3; 136/244; 136/250

(58) Field of Classification Search
USPC ............... 52/57, 173.1, 173.3; 136/244, 251
See application file for complete search history.

(56) References Cited

U.S. PATENT DOCUMENTS

| | | | | |
|---|---|---|---|---|
| 3,893,506 A | * | 7/1975 | Laing | 165/236 |
| 4,189,881 A | * | 2/1980 | Hawley | 52/91.3 |
| 4,430,384 A | * | 2/1984 | George | 428/377 |
| 5,092,939 A | * | 3/1992 | Nath et al. | 136/251 |
| 5,164,020 A | * | 11/1992 | Wagner et al. | 136/251 |
| 5,391,858 A | * | 2/1995 | Tourangeau et al. | 219/213 |
| 5,575,861 A | | 11/1996 | Younan | |
| 5,647,916 A | * | 7/1997 | Guazzoni | 136/253 |
| 5,961,737 A | * | 10/1999 | Glenn | 136/244 |
| 5,990,414 A | * | 11/1999 | Posnansky | 136/244 |
| 6,182,403 B1 | * | 2/2001 | Mimura et al. | 52/173.3 |
| 6,201,180 B1 | * | 3/2001 | Meyer et al. | 136/244 |
| 6,309,721 B1 | * | 10/2001 | Gladfelter et al. | 428/36.1 |
| 6,465,724 B1 | * | 10/2002 | Garvison et al. | 136/244 |
| 6,649,822 B2 | | 11/2003 | Eguchi | |
| 6,759,630 B1 | * | 7/2004 | Tenute | 219/213 |
| 6,960,716 B2 | * | 11/2005 | Matsumi et al. | 136/244 |
| 6,967,278 B2 | * | 11/2005 | Hatsukaiwa et al. | 136/251 |
| 8,079,183 B2 | * | 12/2011 | Lenney | 52/12 |
| 8,215,070 B2 | | 7/2012 | Railkar | |
| 2002/0134421 A1 | * | 9/2002 | Nagao et al. | 136/244 |
| 2004/0098932 A1 | * | 5/2004 | Broatch | 52/173.1 |
| 2005/0210806 A1 | * | 9/2005 | Guerra | 52/518 |
| 2008/0271773 A1 | | 11/2008 | Jacobs et al. | |
| 2008/0276984 A1 | | 11/2008 | Gumm | |
| 2009/0000221 A1 | | 1/2009 | Jacobs et al. | |
| 2009/0000222 A1 | | 1/2009 | Kalkanoglu et al. | |
| 2009/0000657 A1 | * | 1/2009 | Jacobs | 136/251 |
| 2009/0133340 A1 | | 5/2009 | Shiao et al. | |
| 2009/0133738 A1 | | 5/2009 | Shiao et al. | |
| 2009/0133739 A1 | | 5/2009 | Shiao et al. | |
| 2009/0159118 A1 | | 6/2009 | Kalkanoglu et al. | |
| 2009/0178350 A1 | | 7/2009 | Kalkanoglu et al. | |

(Continued)

*Primary Examiner* — Ryan Kwiecinski
(74) *Attorney, Agent, or Firm* — McDonnell Boehnen Hulbert & Berghoff LLP (57) ABSTRACT

The present invention relates generally to electrical systems. The present invention relates more particularly to electrical wiring systems suitable for use in roofing applications. One aspect of the invention is a wiring system on a roof comprising a roof deck having a slope and one or more roofing elements disposed on the roof deck, the wiring system including one or more wires extending along the roof disposed within a tube having an outer surface that is substantially exposed and complements the appearance of the roofing elements.

20 Claims, 6 Drawing Sheets

(56) References Cited

U.S. PATENT DOCUMENTS

| | | |
|---|---|---|
| 2010/0146878 A1 | 6/2010 | Koch et al. |
| 2010/0170169 A1* | 7/2010 | Railkar et al. ............... 52/173.3 |
| 2010/0180523 A1* | 7/2010 | Lena et al. .................. 52/173.3 |
| 2010/0242381 A1 | 9/2010 | Jenkins et al. |
| 2010/0275534 A1 | 11/2010 | Ruskin et al. |
| 2011/0017278 A1 | 1/2011 | Kalkanoglu et al. |
| 2011/0030761 A1* | 2/2011 | Kalkanoglu et al. .......... 136/245 |
| 2011/0047901 A1* | 3/2011 | Dierbeck .................... 52/173.1 |
| 2011/0088749 A1* | 4/2011 | Shimizu ....................... 136/244 |
| 2011/0314753 A1 | 12/2011 | Farmer et al. |
| 2012/0085040 A1 | 4/2012 | Ketwitz, Jr. |
| 2012/0137600 A1* | 6/2012 | Jenkins ....................... 52/173.3 |
| 2012/0151855 A1* | 6/2012 | Malpas ........................ 52/173.3 |
| 2012/0192509 A1* | 8/2012 | Chihlas et al. ............... 52/173.1 |
| 2012/0192512 A1* | 8/2012 | Gombarick, Jr. ............. 52/173.3 |
| 2012/0210660 A1 | 8/2012 | Livsey et al. |
| 2012/0222716 A1* | 9/2012 | Gillenwater ................. 136/244 |
| 2012/0255244 A1* | 10/2012 | Hendrickson et al. ....... 52/173.3 |

* cited by examiner

ELECTRICAL WIRING SYSTEMS FOR USE IN ROOFING APPLICATIONS

BACKGROUND OF THE INVENTION

1. Field of the Invention

The present invention relates generally to electrical systems. The present invention relates more particularly to electrical wiring systems suitable for use in roofing applications.

2. Technical Background

The search for alternative sources of energy has been motivated by at least two factors. First, fossil fuels have become increasingly expensive due to increasing scarcity and unrest in areas rich in petroleum deposits. Second, there exists overwhelming concern about the effects of the combustion of fossil fuels on the environment due to factors such as air pollution (from $NO_x$, hydrocarbons and ozone) and global warming (from $CO_2$). Moreover, the very discovery and exploitation of fossil fuels carries significant environmental risk. In recent years, research and development attention has focused on harvesting energy from natural environmental sources such as wind, flowing water, and the sun. Of the three, the sun appears to be the most widely useful energy source across the continental United States; most locales get enough sunshine to make solar energy feasible.

Accordingly, there are now available components that convert light energy into electrical energy. Such photovoltaic elements are often made from semiconductor-type materials such as doped silicon in either single crystalline, polycrystalline, or amorphous form. The use of photovoltaic elements on roofs is becoming increasingly common, especially as device performance has improved. They can be used to provide at least a significant fraction of the electrical energy needed for a building's overall function; or they can be used to power one or more particular devices, such as exterior lighting systems.

Often perched on an existing roof in panel form, these photovoltaic elements can often be quite visible and generally not aesthetically pleasant. Moreover, the electrical cables used to interconnect the photovoltaic elements can be another source of aesthetic dissonance. Nonetheless, to date, installations have appeared to have been motivated by purely practical and functional considerations; there appears to have been little coordination between the appearance of the photovoltaic system and the roofing materials (e.g., tiles or shingles) and buildings upon which they are mounted. Lack of aesthetic appeal is especially problematic in residential buildings with non-horizontally pitched roofs; people tend to put a much higher premium on the appearance of their homes than they do on the appearance of their commercial buildings.

Accordingly, there remains a need for photovoltaic systems having more controllable and desirable aesthetics for use in roofing applications while retaining sufficient efficiency in electrical power generation, and for aesthetically appropriate building elements for use with photovoltaic systems.

SUMMARY OF THE INVENTION

One aspect of the invention is a wiring system on a roof comprising a roof deck having one or more roofing elements disposed thereon, the wiring system comprising one or more wires extending along the roof disposed within a tube having an outer surface that is substantially exposed and complements the appearance of the roofing elements.

Another aspect of the invention is a method for constructing a wiring system as described above, the method comprising disposing the wires on the roof, and disposing the tube around the wires.

DETAILED DESCRIPTION OF THE INVENTION

One aspect of the invention is a wiring system on a roof comprising a roof deck having one or more roofing elements disposed thereon, the wiring system comprising one or more wires extending along the roof disposed within a tube having an outer surface that is substantially exposed and complements the appearance of the roofing elements.

Figure 1:
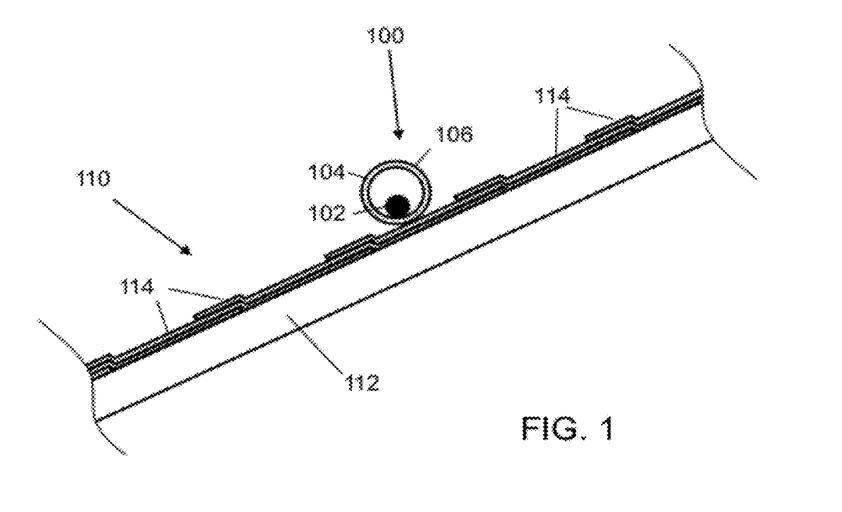
FIG. 1 is a schematic cross-sectional view.
Figure 2:
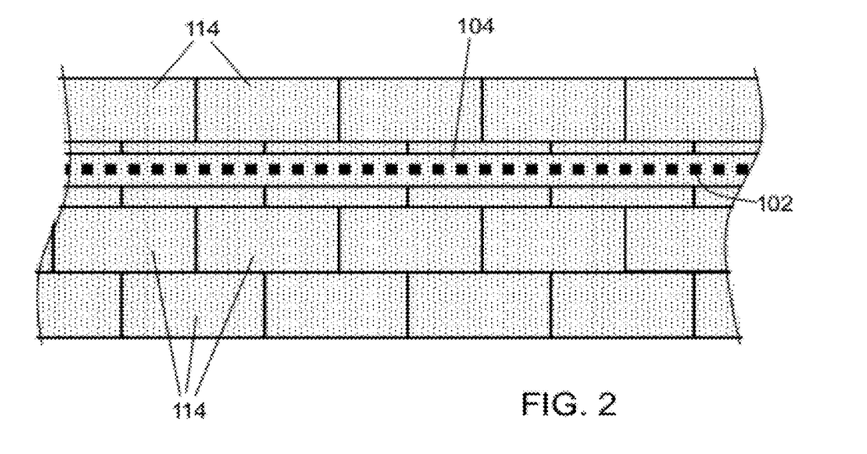
FIG. 2 is a top schematic view of a wiring system according to one embodiment of the invention.

One embodiment of the invention is shown in schematic cross-sectional view in FIG. 1 and in top schematic view in FIG. 2. A wiring system 100 is disposed on a roof 110. Roof 110 includes a roof deck 112 with roofing elements 114 disposed thereon, arranged in offset overlapping rows as is familiar to the person of skill in the art. Wiring system 100 includes a wire 102 extending along the roof 110 on top of the roofing elements 114, disposed within a tube 104. The tube 104 has an outer surface 106 that is substantially exposed (i.e., visible to an observer) and complements the appearance of the roofing elements. In the schematic top view of FIG. 2, wire 102 is shown in dotted line, as it is disposed within the tube 104.

In the embodiment of FIG. 1, the roofing elements are asphalt roofing shingles. Of course, the person of skill will appreciate that other types of roofing elements can be used in practicing the present invention. Examples of roofing elements suitable for use in this aspect of the invention include shingles, tiles, panels, membranes and shakes, made from such materials as asphalt, polymeric materials, ceramic materials, stone, cementitious materials, and wood. In certain embodiments, a photovoltaic element is integrated with one or more of the roofing elements. The integration can be achieved in many ways, for example as described in U.S. Patent Application Publications nos. 2008/0271773, 2009/0000221, 2009/0000222, 2009/0133340, 2009/0133738, 2009/0133740, 2009/0133739, 2009/0159118, 2009/0178350 and 2010/0146878, and in U.S. Provisional Patent Applications Ser. Nos. 61/220,475 and 61/232,739 each of which is hereby incorporated herein by reference in its entirety for all purposes. The wiring system can thus be used to interconnect the photovoltaic roofing elements with one another and/or to an electrical system to collect the energy generated thereby. In certain embodiments, the roof has a pitch of at least about 1"/12", at least about 2"/12", or even at least about 4"/12", about 6"/12", about 8"/12" or about 12"/12".

In certain embodiments, the tube has roofing granules disposed on its outer surface. The roofing granules can be selected and/or distributed to complement the appearance of the roofing elements of the roof upon which the wiring system is disposed. Such a wiring system can be especially useful when disposed on a roof that includes roofing elements based upon granule-covered roofing elements, for example, granule-covered asphalt shingles, or photovoltaic roofing elements based on granule-covered asphalt shingles. Of course, a tube having roofing granules at its outer surface can also be used to complement other types of roofing elements (e.g., wood, stone), with an appropriate selection and/or distribution of roofing granules.

For example, in one embodiment, the tube itself comprises one or more layers of granule-covered asphalt roofing material. The tube can, for example, be formed from granule-covered asphalt roofing material of the same thickness as that used in granule-covered asphalt shingles. In other embodiments, the tube can be formed from materials that are of different thickness (e.g., thinner, or thicker) than the materials used in granule-covered asphalt shingles. The granule-covered roofing material can be used, for example, to merely clad the outside of a tubular support member (e.g., as described below with reference to FIGS. 10 and 11). In other embodiments, the granule-covered roofing material can form the tube itself (e.g., as described below with reference to FIG. 4).

Figure 3:
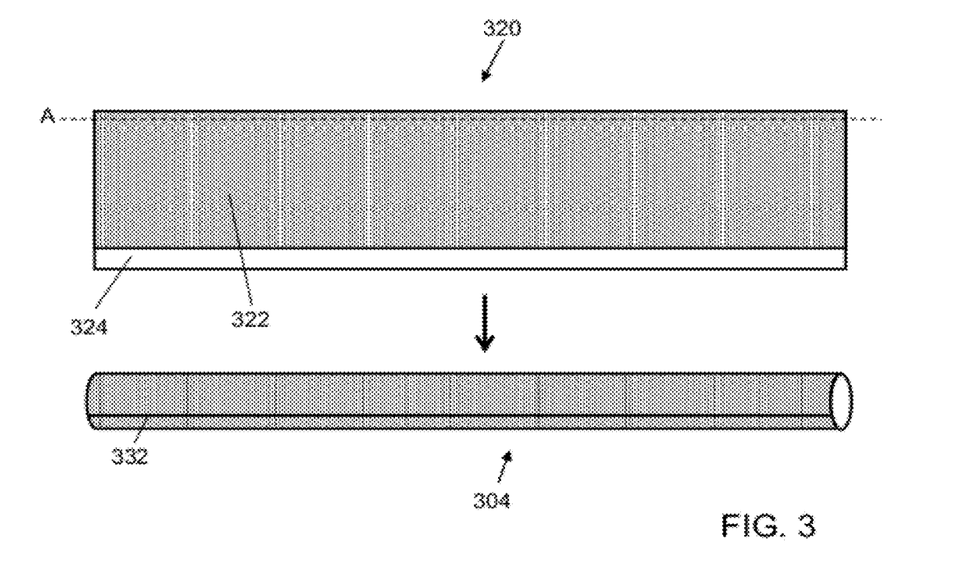
FIG. 3 is a schematic view of the construction of a tube suitable for use in the present invention.

The tube can be constructed, for example, as shown in FIG. 3. A sheet of asphalt shingle material 320 includes a granule-coated region 322 and a non-granule-coated or selvage region 324. The sheet can be rolled into a tube 304, and the top surface (i.e., facing out of the page) of the non-coated region can be adhered to the underside of the granule coated region (e.g., at the edge denoted by line "A") to seal the tube, forming a seam 332 running axially along the tube. In certain embodiments, the non-coated region has an adhesive provided thereon (e.g., a pressure-sensitive adhesive), covered by a release paper. In other embodiments, a separate adhesive (e.g., butyl, modified asphalt sealant, epoxy) can be used. Of course, in other embodiments, the entire surface of the sheet can be granule-coated. Moreover, the non-granule-coated or selvage region could be coated with something other than roofing granules, e.g., sand or polymer granules, or have some other surfacing formed thereon, for example, to aid in adhesion. The sheet can be curved or bent to form tubes having other cross-sectional shapes than circular (e.g., oval, triangular, rectangular). The tube can be constructed around a form of a desired cross-sectional shape (e.g., a length of pipe, or a rectangular batten), then be removed from the form as a free-standing tube.

Figure 4:
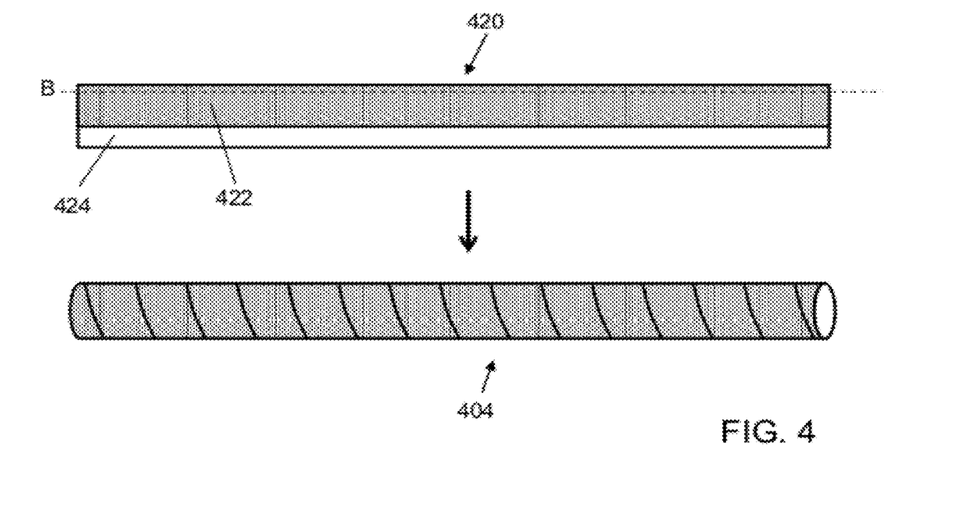
FIG. 4 is a schematic view of the construction of another tube suitable for use in the present invention.

In another embodiment, the tube is formed from a strip of asphalt roofing material, wound helically, as shown in schematic side view in FIG. 4. Strip of asphalt shingle material 420 includes a granule-coated region 422 and a non-granule-coated or selvage region 424. The sheet can be helically wound into a tube 404, and the top surface (i.e., facing out of the page) of the non-coated region can be adhered to the underside of the granule coated region (e.g., at the end denoted by line "B") to seal the tube. In certain embodiments, the non-coated region has an adhesive provided thereon (e.g., a pressure-sensitive adhesive), covered by a release paper. In other embodiments, a separate adhesive (e.g., butyl, modified asphalt sealant, epoxy) can be used. Of course, in other embodiments, the entire surface of the strip can be granule-coated. Moreover, the strip can be bent to form tubes having other cross-sectional shapes than circular (e.g., triangular, rectangular).

In other embodiments of the invention, strips or sheets of granule-coated asphalt roofing material can be formed or wound around and adhered to a support tube. In such cases, a separate adhesive can be used (e.g., disposed on the support tube before the granule-coated asphalt material is formed or wound), and the edges of the granule-coated asphalt roofing material can merely be abutted against one another to provide a continuous-looking surface (e.g., to substantially cover the support tube). The support tube can be, for example, a length of rigid conduit (e.g., electrical code approved conduit) used as a form, around which the sheet is formed, and which is left in place. In such embodiments, the tube has the desirable properties of rigid conduit, but its outer surface is modified to provide a visual aspect complementary of the surrounding roofing materials.

Figure 5:
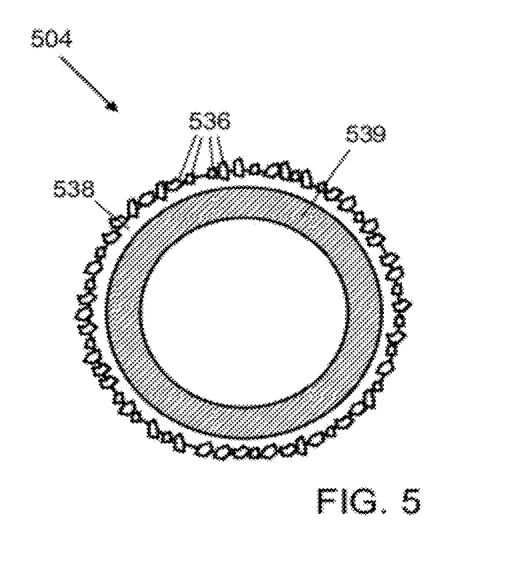
FIG. 5 is a schematic cross-sectional view of a tube suitable for use in certain embodiments of the invention.

In another embodiment of the invention, the tube is formed from some other material, and has roofing granules adhered at its outer surface. The tube can, in some embodiments, be rigid, for example, formed from metal (e.g., steel, aluminum), plastic (e.g., PVC). An adhesive (e.g., butyl, modified asphalt sealant, epoxy) or laminate structure (e.g., as described in 5,194,113 and in U.S. Patent Application Publication no. 2008/0271773, each of which is hereby incorporated herein by reference in its entirety) can be used to adhere the roofing granules to the tube. For example, a tube according to one such embodiment is shown in schematic cross-sectional view in FIG. 5. Tube 504 has roofing granules 536 adhered at its outer surface, using an adhesive 538 disposed about a piece of PVC pipe 539. The adhesive can be colored to help provide a tube surface that complements the roofing elements.

In certain embodiments, the tube has an openable seam along its side, which can be opened to allow access to the wire inside. Such embodiments can allow the person of skill to install the tube around wires already existing on a roof; or to swap wires from within an existing wiring system. Of course, in other embodiments, the tube has no openable seam; in such cases, the seam through which the wires are fed is sealed, or the wires are fed into the tube through the end of the tube.

A variety of types of roofing granules may be used in practicing various aspects of the present invention. Roofing granules may be made from virtually any material that will withstand exposure to the environment without substantially degrading over a period of years, e.g., rock, mineral, gravel, sand, ceramic, or plastic. In certain embodiments of the invention, the granules are ceramic-coated mineral core particles optionally colored with metal oxides, such as those conventionally used on asphalt roofing shingles. The mineral core can consist of any chemically inert matter that can support a ceramic layer and has adequate mechanical properties. The mineral particles, which can be produced by a series of quarrying, crushing, and screening operations, are generally intermediate between sand and gravel in size (that is, between about 8 US mesh and 70 US mesh), and can, for example, have an average particle size of from about 0.2 mm to about 3 mm, and more preferably from about 0.4 mm to about 2.4 mm. In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as recycled manufactured materials such as crushed bricks, concrete, porcelain, ceramic grog and fire clay.

Other materials, such as natural mineral matter (e.g., sand, crushed rock, and the materials listed above as suitable for the cores of coated granules), polymeric granules, and other synthetic materials can also be used. Polymeric materials, for example, can be provided with a variety of shapes (e.g., spherical, angular, sub-angular), which can contribute, in whole or in part, to the desired appearance. Ceramic particulates, such as those used as proppants in the energy industry, can also be used.

In certain embodiments, the granules are disposed at the surface of the tube with a surface fill factor of greater than about 60%. The surface fill factor is the fraction of the surface of the tube that is occluded by the granules, as measured in a direction normal to the surface. Desirably, the granules have a surface fill factor of greater than about 75%. In certain desirable embodiments of the invention, the granules have a surface fill factor of greater than about 85%. Granule surface coverage can be measured using image analysis software, namely, Image-Pro Plus from Media Cybernetics, Inc., Silver Spring, Md. 20910. The shingle surface area is recorded in a black and white image using a CCD camera fitted to a microscope. The image is then separated into an asphalt coating portion and a granule covering portion using the threshold method in gray scale. The amount of granule coverage is then calculated by the image analysis software based upon the number of pixels with gray scale above the threshold level divided by the total number of pixels in the image.

In certain embodiments of the invention, the granules are relatively dark in color. For example, in one embodiment of the invention, the granules are solar-reflective roofing granules that can have an $L^*$ less than 55, or even less than 35.

In certain embodiments, the outer surface of the tube is solar reflective. For example, the roofing granules disposed thereon can, for example, be solar reflective granules. Solar-reflective granules can be used, for example, in areas of the tube that are to remain exposed to the atmosphere when it is disposed on the roof. In other embodiments, a different solar reflective material is disposed on the outside of the tube. The solar-reflective granules or material can operate to reflect a portion of the solar radiation (e.g., in the infrared wavelengths) and thereby decrease the buildup of heat in the tube. The effective working temperatures of the roof can thereby be lowered, which can be advantageous in maintaining structures in the tube at a desirably low temperature. The solar-reflective roofing granules or material can be disposed on the tube in an amount sufficient to provide the reflective area with a solar reflectivity greater than about 0.25. In one embodiment of the invention, the solar-reflective roofing granules or material have a solar reflectivity greater than about 0.3, or even greater than about 0.4. Solar reflectance can reduce the effective temperature of the tube, which can improve the efficiency of power transfer by a cable disposed therein, and can help to prevent thermal failure of the materials used therein. Moreover, when conduit is disposed within the tube (for example, as described hereinbelow), use of solar reflective granules or materials can help to keep the conduit below its rated temperature. Solar-reflective roofing granules are described, for example, in U.S. Pat. No. 7,241,500, and U.S. Patent Application Publications nos. 2005/0072110 and 2009/0133738, each of which is hereby incorporated herein by reference in its entirety. The person of skill in the art can adapt other solar reflective materials (e.g., multilayer interference films) for use at the outer surface of the tube.

In certain embodiments of the invention, the solar-reflective roofing granules comprise base particles coated with a coating composition comprising a binder and at least one infrared-reflective pigment. The binder can be, for example, a metal silicate binder or a polymeric binder suitable for outdoor exposure. The infrared-reflective pigment can comprise, for example, a solid solution including iron oxide and/or a near-IR-reflecting composite pigment, as described in U.S. Pat. Nos. 6,174,360 and 6,521,038, each of which is hereby incorporated herein by reference in its entirety Infrared-reflective "functional" pigments such as light-interference platelet pigments including titanium dioxide, light-interference platelet pigments based on metal oxide coated substrates, mirrorized silica pigments based on metal doped silica, and alumina can also be used instead of or in addition to other infrared-reflective pigments. Infrared-reflective functional pigments can enhance the solar reflectivity when incorporated in roofing granules.

In other embodiments of the invention, the solar-reflective roofing granules comprise base particles coated with a first coating composition including a binder and at least one reflective white pigment; and a second coating composition disposed about the first coating composition and comprising a binder and at least one colorant selected from the group consisting of UV-stabilized dyes and granule coloring pigments, such as those based on metal oxides, colored infrared-reflective pigments, and infrared-reflective functional pigments. In these embodiments of the invention, the first (inner) coating composition can reflect most of the solar radiation that penetrates the second (outer) coating, thereby improving the overall solar reflectivity. The reflective white pigment can be based, for example, on titanium dioxide, zinc oxide or zinc sulfide. In certain embodiments of the invention, the first coating composition comprising the reflective white pigment has a solar reflectivity of at least 0.6.

In other embodiments of the invention, the solar-reflective roofing granules comprise base particles coated with a first coating composition comprising a binder and at least one colorant selected from the group consisting of UV-stabilized dyes and granule coloring pigments, such as those based on metal oxides, colored infrared-reflective pigments, and infrared-reflective functional pigments; and a second coating composition disposed about the first coating composition and comprising a binder and at least one infrared-reflective pigment. In these embodiments of the invention, the first (inner) coating composition helps to provide a desired color (alone or in combination with the infrared-reflective pigment), and the second (outer) coating reflects infrared in order to provide solar reflectivity. The infrared-reflective can be, for example, selected from the group consisting of light-interference platelet pigments including mica, light interference platelet pigments including titanium dioxide, mirrorized silica pigments based on metal-doped silica, and alumina Transparent IR-reflective pigments, nanoparticulate titanium dioxide, or mirrorized fillers, for example, can be used as the infrared-reflective pigment.

Binders for use in solar-reflective granules can be inorganic or organic. For example, suitable inorganic binders can include aluminosilicate materials (clay) and alkali metal silicates. Phosphate-based systems can also be used as inorganic binders, as described in U.S. Patent Application Publication no. 2008/0241516, which is hereby incorporated herein by reference in its entirety. In certain embodiments of the invention, however, the binder does not include kaolin. Suitable organic binders can include organic polymers such as acrylic polymers and copolymers. As the person of skill in the art will appreciate, the selection of a binder will depend on the nature of the pigments employed.

The solar-reflective roofing granules used in the present invention can have a higher heat reflectance than conventional roofing granules prepared only with conventional metal oxide colorants, which typically have a solar reflectivity in the range of 0.12 to 0.20. Accordingly, they can be used to make roofing substrates having solar reflectivity of at least 0.25, or even of at least about 0.3, or at least about 0.4. The solar-reflective roofing granules can be of a number of different colors selected to provide a desired overall appearance, as is conventional in asphalt shingle manufacturing. Moreover, the solar-reflective roofing granules can be used in combination with a minor amount of conventional roofing granules in order to provide the desired combination of appearance and solar reflectivity.

The solar-reflective roofing granules used in the present invention can be prepared through conventional granule coating methods, such as those disclosed in U.S. Pat. No. 2,981,636, which is hereby incorporated by reference in its entirety. Suitable base particles, for example, mineral particles with size passing #8 mesh and retaining on #70 mesh, can be coated with a blend of binder and pigment, followed by heat treatment to obtain a durable coating. The coating process can be repeated multiple times with the same coating composition to further enhance color and solar reflectivity.

Of course, in other embodiments, the tube can be formed from a material other than granule-coated asphalt roofing material. For example, in certain embodiments, the tube is formed with a polymeric material or a ceramic material at its outer surface. The tube can be formed from virtually any other material or materials such that the outer surface complements the roofing elements the tube as a whole provides any desired protective function.

In some embodiments, the tube is formed from the same material as the roofing elements. For example, in one embodiment, when the roofing elements include granule-covered asphalt shingles, the tube can be formed from the same granule covered-asphalt shingle material as the top layer of the shingles. When the roofing elements have polymeric top surfaces, the tube can be formed from the same polymeric material. When the roofing elements are formed from wood or ceramic, the tube can be formed from the same materials. Of course, in other embodiments, only the outer surface of the tube can be formed from the same material as the roofing elements.

As described above, the outer surface of the tube complements the appearance of the roofing elements, that is, it is of a color and/or texture that substantially matches or harmonizes with the roofing elements. In certain embodiments, roofing granules are disposed on the outer surface of the tube to provide the desired color and/or texture. For example, granules can be provided having a "midtone," i.e., an overall base color for the tube, along with highlight granules and shadow granules. Various methods, such as so-called "blend-drop" methods are described, for example, in U.S. Pat. No. 6,190,754, and in U.S. Patent Application Publication no. 2010/0218433, each of which is incorporated herein by reference in its entirety. For example, in certain embodiments, the outer surface of the tube has an appearance that blends with that of the roofing elements, is tone matched to that of the roofing elements (e.g., by using the same blend of mixed colored granules as is used in the roofing elements), or is shadow-lined to provide an appearance of shadow to the roofing elements. In other embodiments, the outer surface of the tube contrasts with the roofing elements.

In certain embodiments, a colored or patterned layer is disposed at the outer surface of the tube. The colored or patterned layer includes (either at one of its surfaces or within it) one or more colorants (e.g., dyes or pigments). The colored or patterned layer can also be patterned, in which one or more colors are varied over the area of the layer, for example randomly or in some preselected arrangement. The color(s) and pattern(s) can be selected so that the layer has an appearance that matches, harmonizes with and/or complements a desired type of roofing material, such as asphalt shingles of a given color and design. The pattern of colorant can be, for example, uniform, or can be mottled in appearance. A mottled appearance can, for example, camouflage the tube relative to the shingles and the roof. Other camouflaging techniques can be used to for example, cryptic camouflage (e.g., by matching the background), disruptive camouflage (e.g., using contrasting patterns), countershading (e.g., to make the tube appear flat against the roof), or some combination thereof.

Ink jet printing, digital image printing, laser printing, gravure printing, roll printing, spraying, lithography, or any other suitable printing or coating processes can be used to form the colored or patterned layers for use in the present invention. In some embodiments, a high resolution graphic printing method is employed to replicate the appearance of the surrounding roofing element, or alternatively, the appearance of other structures on the roof (e.g., photovoltaic elements, either integrated with the roofing elements or as stand-alone modules). For example, the colored or patterned layer can approximate the appearance of the roofing substrates (e.g., granule-coated asphalt shingles).

A number of techniques can be used to provide the colored or patterned layer. For example, U.S. Pat. Nos. 5,203,941, 5,284,693, 5,506,031 and 5,662,977, each of which is hereby incorporated by reference herein in its entirety, disclose printed decorative layers disposed beneath a weatherable protective coating. U.S. Pat. No. 6,296,732, which is hereby incorporated herein by reference in its entirety, discloses an extrusion process for print and color coats suitable for imparting decorative aspects to exterior products. U.S. Pat. No. 5,468,532, which is hereby incorporated herein by reference in its entirety, discloses a multilayer article having a graphic layer disposed between a substrate and a protective layer. U.S. Pat. No. 6,180,228, which is hereby incorporated herein by reference in its entirety, discloses a weatherable system having an image layer with a protective layer laminated thereto. U.S. Pat. No. 6,753,065 and U.S. Patent Application Publication no. 2007/0059493, each of which is hereby incorporated herein by reference in its entirety, disclose light-transmissive slip-resistant protective layers for protecting graphic-printed films. U.S. Pat. No. 7,138,173, which is hereby incorporated herein by reference in its entirety, discloses optical films that change color as a function of viewing angle. U.S. Patent Application Publication no. 2008/0006323, which is hereby incorporated herein by reference in its entirety, discloses decorative overlays positioned over photovoltaic elements that can be adapted for use in the present invention.

The outer surface of the tube can be colored and/or patterned to resemble a natural roofing material such wood, slate or stone, or other manmade materials such as ceramic or concrete. For example, in one embodiment of the invention, a graphic print reproducing a natural slate material (i.e., having shading and variegation emulating the natural texture and appearance of slate) is applied to a polymer film to provide the colored or patterned layer. Of course, the outer surface of the tube could be colored and/or patterned to have any desired pattern and/or color, and need not look like traditional roofing materials. In certain embodiments of the invention, the wire covering is colored and/or patterned to match the appearance of the roofing element upon which it is disposed.

When the tube has granules at its outer surface, they can be selected and distributed in order to provide a desired color and/or pattern effect. The color(s) and distribution of the granules may random or as selected by the skilled artisan so that the photovoltaic device has an appearance that matches, harmonizes with and/or complements a desired type of roofing material, such as asphalt shingles of a given color and design. For example, they can be selected and distributed substantially the same as in the granules on the roofing elements. In other embodiments, they can be selected and distributed to provide any of the visual effects described above. Granules can also be pattern-matched to a pattern of the roofing element. For example, the granules on the tube can include a shadow line and contrasting regions to match similar effects on the shingles. Methods for selecting and distributing roofing granules onto sheet-like substrates are familiar to the person of skill in the art. The use of granules is also described in U.S. Patent Application Publication no. 2009/0133738, which is hereby incorporated herein by reference in its entirety.

The outer surface of the tube can have a color that substantially matches a color of the roofing elements. For example, in certain embodiments, the $\Delta E^*$ between the outer surface of the tube and a color of the one or more roofing elements is less than about 30, less than about 20, or even less than about 10. As used herein $L^*$, $a^*$ and $b^*$ are the color measurements for a given sample using the 1976 CIE color space. $L^*$, $a^*$ and $b^*$ values are measured using a HunterLab Model Labscan XE spectrophotometer using a 0° viewing angle, a 45° illumination angle, a 10° standard observer, and a D-65 illuminant. Lower $L^*$ values correspond to relatively darker tones. The strength in color space $E^*$ is defined as $E^*=(L^{*2}+a^{*2}+b^{*2})^{1/2}$. The total color difference $\Delta E^*$ between two articles is defined as $\Delta E^*=(\Delta L^{*2}+\Delta a^{*2}+\Delta b^{*2})^{1/2}$, in which $\Delta L^*$, $\Delta a^*$ and $\Delta b^*$ are respectively the differences in $L^*$, $a^*$ and $b^*$ for the two articles. Granules, selection of tube materials, and/or colored or patterned layers, can, for example, be used to provide the desired color.

In other embodiments, the tube contrasts with the roofing elements. For example, in certain embodiments, at least one of $\Delta E^*$, $\Delta L^*$, $\Delta a^*$, $\Delta b^*$, $(\Delta L^{*2}+\Delta a^{*2})^{1/2}$, $(\Delta L^{*2}+\Delta b^{*2})^{1/2}$, $(\Delta a^{*2}+\Delta b^{*2})^{1/2}$ is greater than about 10, greater than about 25, or even greater than about 50.

As the person of skill in the art will appreciate, the tube can be affixed to the roof in a variety of ways. Conventional fasteners such as nails, staples, clips, screws, bolts, adhesives and the like can be used. The tube can be formed from a material that can be easily nailed through, such as asphalt shingle material. Of course, nailing or fastening tabs or zones can also be provided on the tube. In certain embodiments, fasteners do not penetrate through to the roof deck.

In certain embodiments, the tube can be provided with holes (e.g., round, or of other shapes, such as slits) formed in one or more of its side surfaces, for example, in order to allow for ventilation and draining of impinging liquid such as rainwater and condensation. The holes can be, for example, situated along a down-facing surface of the tube.

Figure 6:
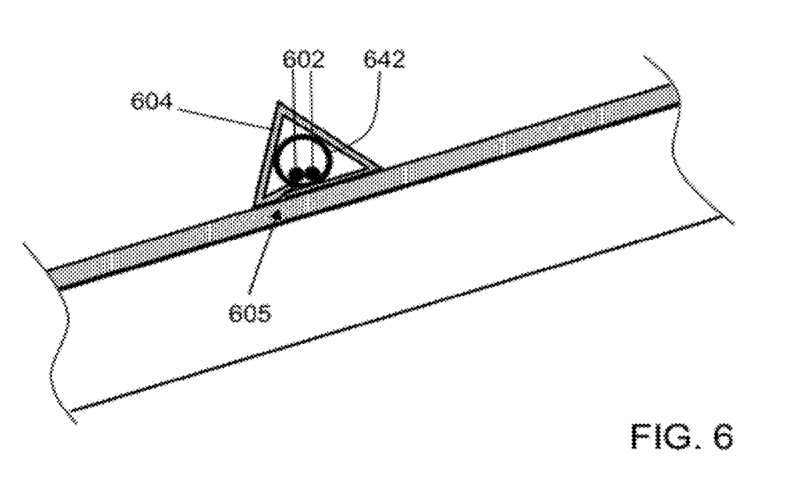
FIG. 6 is a schematic cross-sectional view of a wiring system according to one embodiment of the invention.

The one or more wires can be provided in many different ways. For example, it can be provided as a single wire or cable, or a bundle of wires or cables. In certain embodiments, the wiring (e.g., as wire or cable) is held within a rigid conduit, which the tube substantially surrounds. For example, as shown in schematic cross-sectional view in FIG. 6, wires 602 are held within conduit 642 within tube 604. Such embodiments can be advantageous, in that code-approved conduit can be used, ensuring electrical safety and reliability, while providing the advantages described herein. The tube can in some embodiments have a larger inner dimension than the conduit, for example as shown in FIG. 6. For example, the tube can have an inner diameter that is in the range of about ⅛" to about 1" greater than the outer diameter of the conduit. In other embodiments, the tube can fit closely about the conduit. For example, the tube can have an inner diameter that is less than ⅛" greater than the outer diameter of the conduit. For example, as shown in FIG. 6, the tube can In certain embodiments, the tube can have an inner dimension large enough to closely fit a locally thicker region of the conduit (e.g., a joint), but loosely fit around the rest of the conduit. The tube 604 of FIG. 6 includes a seam 605, which allows the tube to be placed around the conduit after it is installed on the roof surface, as described above.

The wiring systems of the present invention can be used in conjunction with a variety of roof-mounted electrical systems. Accordingly, another aspect of the invention is a roof-mounted electrical system electrically coupled to a wiring system as described herein. An electrical system is one which generates or receives an electrical signal or electrical power. For example, the wiring systems of the present invention can be used in conjunction with (e.g., electrically interconnected with) roof-mounted photovoltaic modules, to interconnect individual modules and/or to connect them to a larger electrical system (e.g., through an inverter). The wiring systems of the present invention can also be used to interconnect individual photovoltaic roofing elements, and/or to connect them to a larger electrical system (e.g., through an inverter). The wiring systems of the present invention can also be used in conjunction with other roof-mounted electrical systems, such as windmills, evaporative coolers, lights, communications equipment such as antennae, satellite dishes, or audio equipment. The wiring systems can be made to aesthetically and mechanically integrate with the electrical systems and any other wiring features, for example at the edge of the roof or at a roof penetration.

The wiring systems described herein can be used in conjunction with the photovoltaic systems described in U.S. Patent Application Publications nos. 2008/0271773, 2008/0271774, 2009/0000221, 2009/0000222, 2009/0126782, 2009/0133340, 2009/0133738, 2009/0133740, 2009/0133739, 2009/0159118, 2009/0178350, 2009/0194143, 2009/0205270, 2009/0242015, 2010/014678 and 2010/0242381, and in U.S. Provisional Patent Applications Ser. Nos. 61/220,475, 61/232,739 61/261,638 and 61/291,954, each of which is hereby incorporated herein by reference in its entirety for all purposes. The tubes described herein can be used to cover wires that are within the systems described therein, and additionally or alternatively to cover wires that connect the systems described therein to an electrical system.

Figure 7:
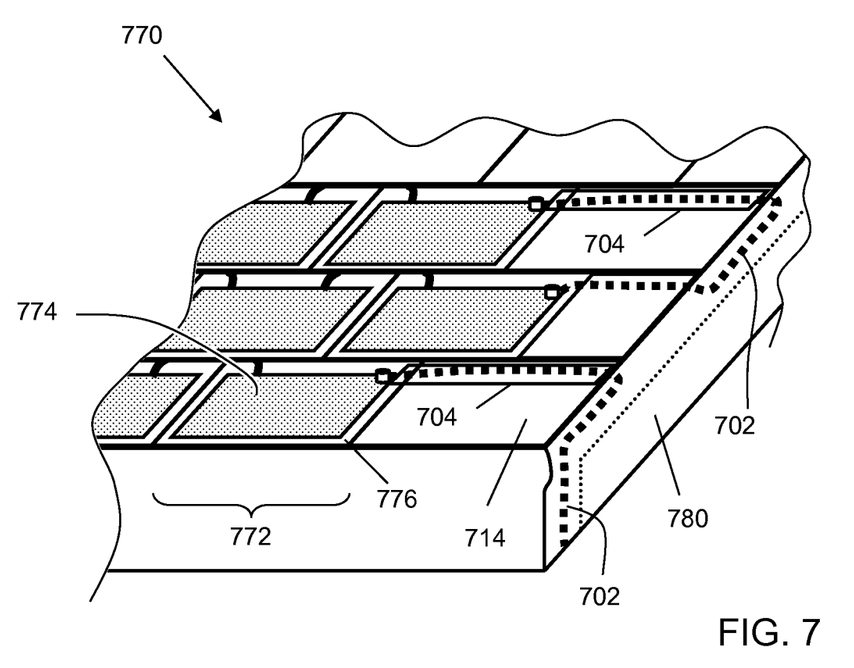
FIG. 7 is a schematic cross-sectional view of a wiring system according to another embodiment of the invention.

The wiring systems as described herein can be used in conjunction with other building elements that conceal wires or cables. For example, as shown in schematic perspective view in FIG. 7, the wiring systems can be used with a trim strip that covers the wiring, for example, as it runs along the fascia of the roof, as described in more detail in U.S. Patent Application Publication no. 2009/0000657, which is hereby incorporated herein by reference in its entirety. In the photovoltaic roofing system 770, photovoltaic roofing elements 772, each including a photovoltaic element 774 disposed on a roofing substrate 776, wired together to form the photovoltaic roofing system. Wires 702 traverse roofing elements 714 at the edge of the roof, and run along the fascia of the roof underneath trim strip 780. On the roof, wires 702 are disposed within tube 704, as described herein.

Figure 8:
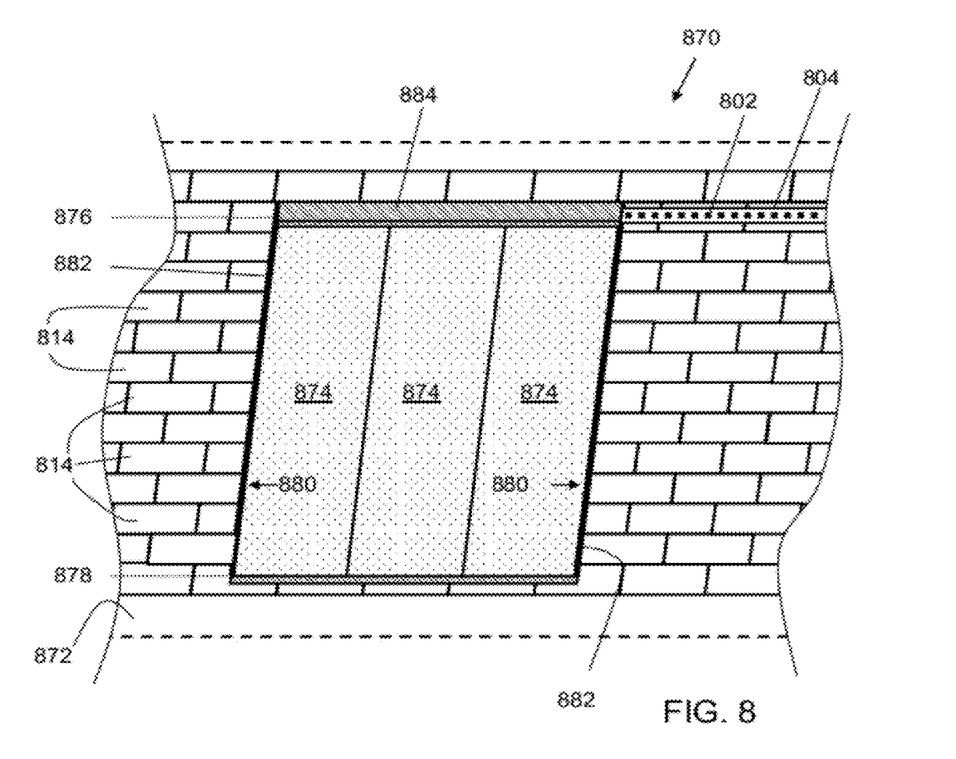
FIG. 8 is a schematic cross-sectional view of a wiring system according to another embodiment of the invention.

The wiring systems as described herein can be used in conjunction with the systems described in U.S. Patent Application Publication no. 2010/0242381, which is hereby incorporated herein by reference in its entirety. For example, FIG. 8 shows an example of a wiring system according to the present invention used in conjunction with a photovoltaic roofing system as described in the 2010/0242381 publication. Photovoltaic roofing system 870 includes a roof deck 872, upon which one or more (in this case, three) photovoltaic elements 874 are disposed. The one or more photovoltaic elements (together) have a top edge 876 facing the upper end of the roof deck; a bottom edge 878 facing the lower end of the roof deck, and two side edges 880. The photovoltaic roofing system also includes a plurality of roofing elements 814 disposed outside the photovoltaic area, along their side edges 880. In this embodiment, the roofing elements are granule-coated bituminous shingles. Photovoltaic roofing system 870 also includes linearly-extending side flashing 882 disposed along the side edges of the contiguously-disposed photovoltaic elements. Wiring 802 connects the photovoltaic elements 874 to an electrical system (not shown), and is disposed within tube 804 as described herein.

Figure 9:
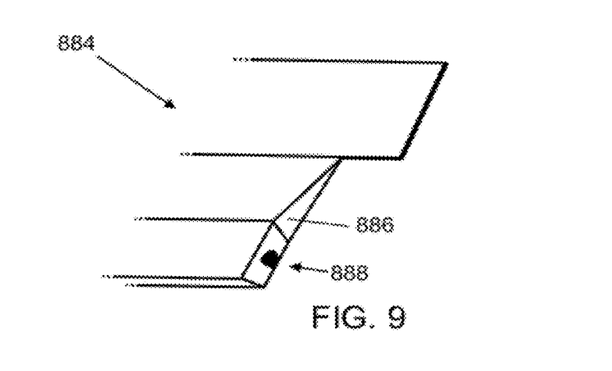
FIG. 9 is a schematic perspective view of a top flashing suitable for use in certain embodiments of the invention.

The photovoltaic system can include a top flashing disposed along the top edge of the photovoltaic area, as shown in the embodiment of FIG. 8 by reference numeral 884. In certain embodiments, the top flashing can include one or more cavities and/or recesses that act as a cover and/or conduit for electrical connectors or cables or other electrical features that protrude from the surface of the photovoltaic elements at their top edges. The end of an example of a top flashing for use with the wiring systems described herein is shown in schematic perspective view in FIG. 9. The top flashing 884 has a side 886 that substantially closes off the volume in which the electrical connectors and/or cables associated with the photovoltaic elements. The side 886 has a hole 888 formed therein, through which the wiring can emerge, then be covered by the wire covering, as described above with reference to FIG. 8.

The wiring systems described herein can be installed in a number of ways. For example, one aspect of the invention is a method for constructing a wiring system as described herein. The method includes disposing the wires on the roof, then disposing the tube around the wires. In one such method, the tube is constructed in situ around the wires while on the roof from flat sheeting or strips (for example, as described above with reference to FIGS. 3 and 4). The tube can also be pre-formed, but with an open seam through which the wires can be installed. The seam can optionally be sealed after the wires are installed therein. In other embodiments, wire is drawn through a tube (optionally with conduit disposed therein), then the assembly is disposed on a roof. In yet another embodiment, wire is drawn through a conduit, which is then disposed on the roof; the tube is formed in situ around the conduit.

EXAMPLES

Figure 10:
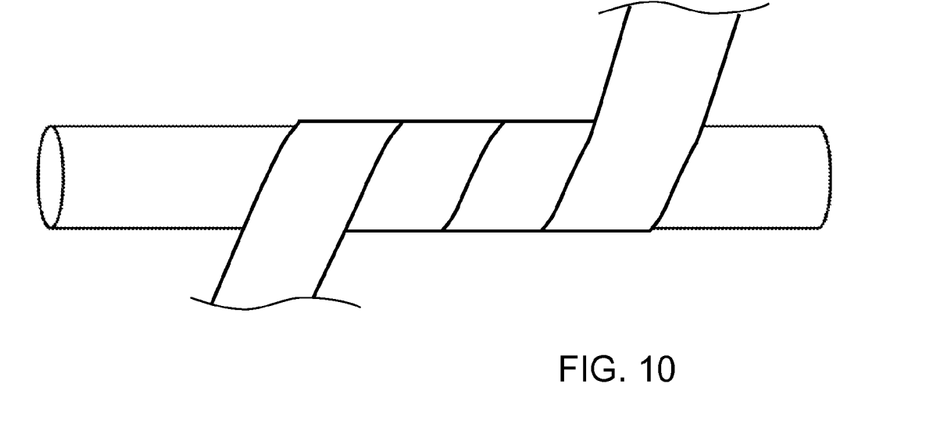
FIGS. 10 and 11 are a set of photographs showing the construction of a tube according to one embodiment of the invention.
Figure 11:
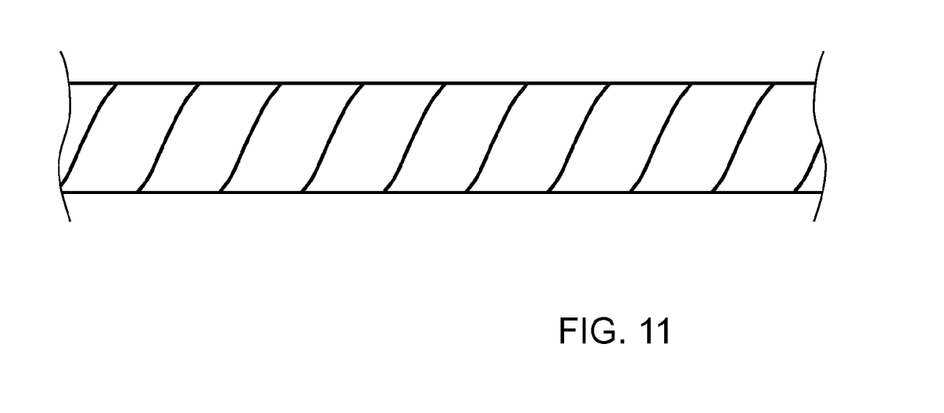

FIGS. 10 and 11 show the construction of a tube according to one embodiment of the invention. A strip of granule-covered asphalt roofing material and a PVC pipe are used to construct the tube. The granule-covered strip is wound helically around the PVC pipe, with the edges of adjacent wraps butted up against one another, as shown in FIG. 10. The completed tube is shown in FIG. 11. In one embodiment, the strip has two different colors, each extending along one of the long edges of the strip, forming a pair of helically-extending colored strips on the. In another embodiment, the strip is uniform in color.

In another embodiment of the invention. In this embodiment, the strip of roofing material has an uncoated area, which is has an adhesive protected by a release liner disposed thereon, as described above with respect to FIG. 4. The strip is helically wound around a length of PVC pipe, and the release liner is removed to expose the adhesive. Subsequent wraps are adhered onto the adhesive of the previous wrap, as described above with respect to FIG. 4, to form the tube around the pipe. The pipe is removed, leaving a free-standing tube formed from the strip of granule-coated roofing material as shown in FIG. 4.

Certain aspects of the invention can be further as described in U.S. Patent Application Publication no. 2012/0192509, which is hereby incorporated herein by reference in its entirety.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

What is claimed is:

1. A wiring system on a roof comprising a roof deck having one or more granule-covered roofing elements disposed thereon so as to be exposed, the wiring system comprising one or more wires extending along the roof disposed within a tube having an outer surface that is substantially exposed, the tube being disposed on an exposed area of one or more of the granule-covered roofing elements and comprising roofing granules coating the outer surface of the tube, the color difference $\Delta E^*$ between the outer surface of the tube and the one or more granule-covered roofing elements is less than about 20.

2. The wiring system according to claim 1, wherein the tube comprises rigid conduit having roofing granules affixed directly to the outer surface of the rigid conduit.

3. The wiring system according to claim 1, wherein the tube comprises one or more layers of granule-covered asphalt roofing material formed in a tubular shape.

4. The wiring system according to claim 3, wherein the granule-covered asphalt roofing material of the tube is a strip of asphalt roofing material, wound helically.

5. The wiring system according to claim 1, wherein the tube is formed from a sheet of granule-covered asphalt roofing material, formed into a cylinder with a seam running axially along the tube.

6. The wiring system according to claim 5, wherein the seam is openable.

7. The wiring system according to claim 1, wherein the roofing granules coated on the outer surface of the tube are solar reflective granules.

8. The wiring system according to claim 1, wherein the tube is formed from the same material as the granule-coated roofing elements.

9. The wiring system according to claim 8, wherein the roofing elements are granule-covered asphalt shingles having a top layer, and the tube is formed from the same granule-covered asphalt shingle material as the top layer of the granule-covered asphalt shingles.

10. The wiring system according to claim 1, wherein the $\Delta E^*$ between the outer surface of the tube and the one or more granule-covered roofing elements is less than about 10.

11. The wiring system according to claim 1, wherein the tube substantially surrounds rigid conduit in which the wires are disposed.

12. The wiring system according to claim 1, wherein the tube has holes formed in one or more of the side surfaces of the tube, the holes being configured to allow for ventilation and draining of impinging liquid such as rainwater and condensation.

13. The wiring system according to claim 1, wherein the granules disposed on the outer surface of the tube are formed from the same blend of mixed colored granules as the granules of the granule-covered roofing elements, and wherein the distribution of the granules is the same as the distribution of the granules on the granule-covered roofing elements.

14. A roof-mounted electrical system electrically coupled to a wiring system on a roof comprising a roof deck having one or more granule-covered roofing elements disposed thereon, the wiring system comprising one or more wires extending along the roof disposed within a tube having an outer surface that is substantially exposed, the tube being disposed on an exposed area of one or more of the granule-covered roofing elements and comprising roofing granules coated on the outer surface of the tube, the color difference $\Delta E^*$ between the outer surface of the tube and a color of the one or more roofing elements is less than about 20.

15. The roof mounted electrical system according to claim 14, wherein the electrical system is a windmill, an evaporative cooler, a light, an antenna, a satellite dish or audio equipment.

16. The roof mounted electrical system according to claim 14, wherein the electrical system is a photovoltaic system.

17. A method for constructing a wiring system on a roof comprising a roof deck having one or more granule-covered roofing elements disposed thereon, the wiring system comprising one or more wires extending along the roof disposed within a tube having an outer surface that is substantially exposed, the tube being disposed on an exposed area of one or more of the granule-covered roofing elements and comprising roofing granules coated on the outer surface of the tube, the color difference $\Delta E^*$ between the outer surface of the tube and a color of the one or more roofing elements is less than about 20, the method comprising: disposing the wires on the roof, and then disposing the tube around the wires.

18. The method according to claim 17, wherein the wires are disposed on the roof while within a conduit, and wherein the disposing the tube around the wires comprises disposing the tube around the conduit.

19. The method according to claim 17, wherein the disposing the tube around the wires comprises forming the tube around the wires from flat sheeting or strips of granule-coated roofing material.

20. The method according to claim 17, wherein the disposing the tube around the wires comprises inserting the wires through an open seam formed in the tube, then sealing the seam.

* * * * *